Figure 1:
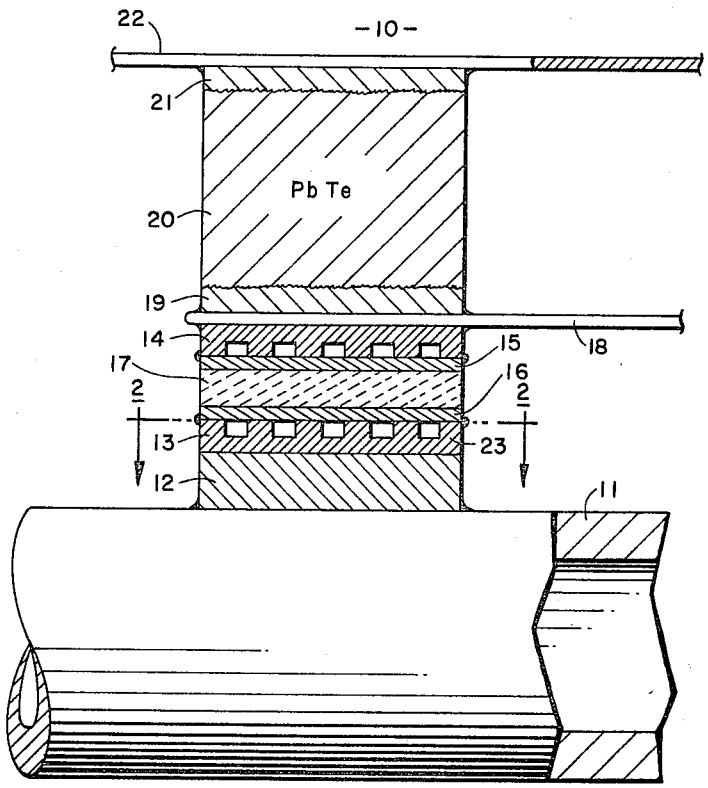

Nov. 8, 1966     E. L. REED ETAL     3,284,176
BONDED METALLIC AND METALIZED CERAMIC MEMBERS
AND METHOD OF MAKING
Filed Oct. 28, 1963

INVENTORS
EDWARD L. REED
BRUCE GRADLE
EVERETT E. GARRETT
BY
Henry Kolin
ATTORNEY United States Patent Office 3,284,176
Patented Nov. 8, 1966

3,284,176
BONDED METALLIC AND METALIZED CERAMIC MEMBERS AND METHOD OF MAKING
Edward L. Reed, Woodland Hills, Calif., Bruce Gradle, Wolfgang, near Hanau, Germany, and Everett E. Garrett, Simi, Calif., assignors to North American Aviation, Inc.
Filed Oct. 28, 1963, Ser. No. 319,334
8 Claims. (Cl. 29—195)

This invention relates to an improved bonded assembly of matallic and metalized non-metallic members, and to methods for providing such an assembly. More particularly it relates to an improved bonded assembly between a metallic member and a ceramic member having a metalized surface.

In the direct conversion of thermal energy to electrical energy by means of thermoelectric devices, a problem frequently arises of conductively transferring heat from a metallic heat source to a thermoelectric material without providing an electrical path between the heat source and the thermoelectric member. In one such method intended to utilize the heat generated in a nuclear reactor, a heat-conducting ceramic member is interposed as electrical insulation between a metallic tube, which is the heat source, and thermoelectric device. Heretofore, to fixedly join a ceramic member to metal members to provide heat transfer and electrical insulation therebetween, flat metal bodies have been brazed to the metalized surfaces of a ceramic body. However, because most ceramic materials have coefficients of thermal expansion which differ substantially from that of most metals, when the metal-ceramic assembly is subjected to varying temperatures, the resulting thermal stresses invariably cause cracking or rupture of the relatively brittle ceramic material. Thus a difference in temperature between the brazing temperature used for bonding the metallic member and the metalized ceramic member and the operating temperature of the assembly is generally sufficient to cause this type of failure.

Attempts have been made to overcome this problem of ceramic fracture by providing graded metal seals between the metalized ceramic surface and the surface of the metallic member. For example, a low expansion iron-nickel (Invar) or iron-nickel-cobalt (Kovar) alloy is first brazed to the metalized ceramic surface, and then the alloy is brazed to the metallic member to be joined. While this technique of providing an intermediately positioned graded expansion alloy may minimize cracking of the ceramic to some extent, the method is not uniformly successful. For example, the coefficients of expansion of the various low-expansion metals used, such as Kovar and Invar, are different at elevated temperatures compared with their coefficients of expansion at lower temperatures. Thus, while thermal stresses may be absent over one temperature range, they will be pronounced over other temperature ranges. Furthermore, this method of providing graded expansion joints increases the number of brazing operations involved as well as the material costs and makes for a more expensive type of bonded assembly.

Accordingly, it is an object of the present invention to provide a thermally stable bonded assembly between a metallic member and a nonmetallic member having a different coefficient of thermal expansion.

It is a further object to provide a bonded assembly of metallic and ceramic members in which the ceramic member is stable against cracking over a wide temperature range.

It is another object to provide a method for obtaining such thermally stable assemblies.

It is still another object to provide a method that is readily adaptable to commercial use and provides thermally stable bonded assemblies.

In accordance with the invention, a plurality of integral raised metal portions of a metallic member are formed on a surface of the metallic member, this surface and the surface of a metalized nonmetallic member are juxtapositioned adjacent each other, and then the raised portions of the metallic member surface are bonded to the metalized portion of the nonmetallic member. Preferably, the nonmetallic member is a ceramic material. In the more specific and preferred aspects of the invention, the metallic member is grooved to provide a regular cross-hatched waffle-like arrangement of stud-like projections to which the metalized ceramic surface is brazed. Thereby, thermal stresses that may arise in the ceramic member are relieved in several directions, compared with the case where corrugations or ridges are provided in the metallic member in only one direction.

Advantageously, the present invention results in thermally stable metal-to-ceramic bonds even where the materials differ widely in their coefficients of thermal expansion. By way of suggested explanation, apparently residual stresses that occur are relieved in the transitional area between the ends of the raised portions and the main body of the metal being bonded to the metalized ceramic member rather than being transferred to the ceramic member and fracturing it.

Figure 2:
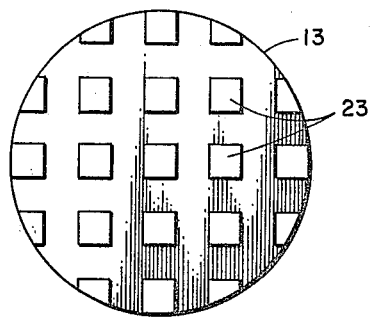

Other features and advantages of this invention will become apparent upon reference to the following examples in conjunction with the accompanying drawings in which:

FIGURE 1 is an elevational view, partly in section, showing a thermoelectric device utilizing the bonded assembly of metallic and ceramic members of the present invention and, FIGURE 2 is a top plan view taken along the lines 2—2 of FIG. 1 of a surface of the metallic member prepared in accordance with a preferred aspect of this invention.

Referring to FIG. 1, a thermoelectric device 10 is shown in which a heat source in a nuclear reactor is molten sodium-potassium flowing through a metallic tube 11, for example, stainless steel. A metallic disk 12, preferably of similar material as tube 11, is brazed to the heat source metallic tube 11. Abutting metallic surfaces of tube 11 and disk 12 are brazed to each other. Metallic disks 13 and 14, grooved to provide waffle-like surfaces for the practice of this invention, are brazed to opposite metalized surfaces 15 and 16 of a ceramic disk 17. For purposes of illustration, the brazed joints between the ceramic metalized surfaces and the raised portions of the grooved disks have been exaggerated in the figure. The flat lower metal surface of disk 13 is brazed to metallic disk 12. A metal strap 18, serving as an electrical output lead, is brazed to the flat surface of the upper serrated or grooved metallic disk 14 and constitutes the hot junction of the thermoelectric couple. Strap 18 is brazed to metal plate 19 which serves as an end cap for the thermoelectric material 20. Similarly, metal plate 21 is joined to the other end of thermoelectric material 20 and serves to form the cold junction of the thermocouple. A metal radiator 22 is brazed to metal plate 21 in order to promote heat dissipation at the cold junction. Conveniently, the hot junction is maintained at about 900° C., with the cold junction at 600° C.

*Example*

By way of a nonlimiting illustrative example, metallic disk 12 is of stainless steel and approximately ½" in diameter by 10 mils thick. The grooved disks 13 and 14 are of copper and approximately 50 mils thick with cross grooves on one surface which are approximately 15 mils deep and provide waffled stud-like projections approximately 1/16" square. The waffled pattern is conveniently formed by pressing the copper disks in a corresponding die. The ends of these projections are brazed to a magnesium silicate disk (forsterite; Alsimag 243) metalized on both faces with a nickel-manganese coating, and which is approximately 1/2" in diameter and 30 mils thick. The electrical output strap 18 is of copper and is brazed to the flat surface of the upper serrated or grooved copper disk 14. The metallic shoes 19 and 21 are of iron and are pressed into the ends of the lead telluride thermoelectric material 20 to form a bond therewith. The metal radiator 22 is of aluminum and is brazed to the top iron end cap 21.

The thermoelectric assembly is prepared by clamping the several members together and positioning brazing alloy preforms of suitable dimensions between the members to be brazed together. The preforms between the grooved disks and the metalized ceramic surfaces are .002" thick, while preforms .004" thick are used between other surfaces to be brazed. Particularly suitable for use are the self-fluxing brazing alloys containing indium. One such alloy that is commercially available contains 61.5% Ag, 24.0% Cu, and 14.5% In (Premabraze 615).

The clamped-together assembly is placed in a retort, provided with an argon atmosphere, and heated to a temperature between 1300 and 1350° F., at which temperature the brazing alloy is fluid. The assembly is then cooled to room temperature. Evaluation of the finished assembly showed that no insulators were cracked and no short circuits were present; measurements of resistivity made between the stainless steel tube 11 and the copper strap 18 ranged from a minimum value of 1.5 megohms to infinity.

Where, in the thermoelectric device shown in FIG. 1, following the procedure used in the foregoing example, flat copper disks were brazed to the metalized ceramic disks without prior providing the grooved, waffled pattern, the ceramic material invariably fractured on cooling. This occurred with several different kinds of metalized ceramic disks. Methods such as providing a Kovar graded-seal between a flat copper disk and the metalized ceramic were also ineffectual as was an attempt to use thin copper disks between the ceramic and metallic members. After brazing, the ceramic disk cracked on cooling.

In FIG. 2 is shown a top plan view of disk 13 in which the stud-like raised portions 23 are shown arranged in a preferred regular waffle-like pattern.

The process of the present invention is particularly useful in providing thermally stable brazed joints in the bonding of elements for miniaturized components and devices. Thus, the cross-sectional area of each of the stud-like projections shown in FIG. 2 will be approximately 1/16-inch square in the foregoing specific example. However, this cross-sectional area may vary from as little as 1 mil in diameter, providing brush-like wire serrations for miniaturized applications such as bonding to transistor elements, to up to 1/8 x 1/8 of an inch in cross section for bonding to larger components. It will be realized that the strength and thermal stability of the resulting brazed bond will be determined in part by the thickness of the stud-like projections, by the difference in thermal expansion between the two members being joined, and by the brittleness and resistance to thermal shock of the ceramic members. Thus, where there are greater stresses present, a waffle-like pattern is provided, so that the residual stresses are more readily relieved in several directions in the transitional area of the waffle between the tips and the main body of the metal that is bonded to the metalized ceramic. For less critical stresses for other applications, corrugations or ridges need be provided in only one direction.

Any of various known metal-working techniques such as cutting, pressing, molding, or grinding may be utilized to provide the grooves, notches, corrugations, and cross-hatchings, so that the resulting raised portions may be in any of various forms or shapes such as nails, wires, studs, ridges, knobs, knurls, protuberances, projections, or serrations. Alternatively, a stud-welding machine may be used to provide a multiplicity of metal studs on a surface of the metallic member without otherwise disturbing the surface. If desired, these metal studs may be of a different metal from the metallic member. The essential feature of the invention resides in relieving the residual stresses by providing raised portions on the surface of the metallic member being joined to the nonmetallic member. A regular waffle-like pattern is preferred because such as pattern is conveniently formed and relieves stresses in a uniform manner in more than one dimension.

Any of various high-melting or refractory nonmetallic members showing suitable high-temperature properties at the temperature of application and having a different coefficient of thermal expansion from the metallic member to which it is to be joined as well as being provided with a metalized surface portion may be used in the practice of this invention. The selection of the brazing alloy will be determined in part by the melting point of the nonmetallic member. Thus, various natural and synthetic stones or gems, grown crystals, whether single crystals or multicrystals, high-resistivity semiconductors, as well as more conventional ceramic materials may be used dependent on the need therefor and the desired application. For example, single crystals of germanium or silicon used in transistor devices may be required to be joined to a metallic member and thermally cycled. Ruby crystals are used in laser devices and may require bonding to a metallic body.

In the particular and preferred aspects of practicing this invention, any of the various ceramic materials that act as heat conductors and electrical insulators, preferably those of high density, may be used in the practice of this invention, such as magnesium silicate, alumina, beryllia, zirconia, titania, mixtures of alumina, silica, and magnesia, titanate dielectrics, steatite, porcelain, and the like. One or more surfaces of the ceramic member are metalized depending upon the particular application. In the application illustrated in FIG. 1, both faces of the forsterite ceramic disk are metalized. Techniques of metalization to provide an extremely thin layer of metal adherently bonded to a ceramic surface are well known in the art. See, for example, British Patents 874,303 and 885,239 and United States Patents 2,903,788 and 2,938,806. Magnesium silicate and alumina disks containing a nickel-manganese coating are commercially available, as are also beryllia disks with metalized coatings. Because of their ready commercial availability, their high density, and their high-temperature properties, such metalized ceramic disks are preferred in the practice of this invention.

The metallic members provided with raised surface portions may be any pure metal or alloy that shows suitable high-temperature properties at the temperature of application. Preferably, such metals will resist temperatures up to 1600° F. without oxidation or corrosion resulting. Although many metals and alloys may be used, copper and its alloys and aluminum and its alloys are preferred because of their good heat and electrical conductivity and their amenability to metal-working techniques. Where copper disks are used, these may be nickel plated to prevent undue penetration of the brazing alloy into the surface of the copper. Any of the well-known brazing alloys may be used, depending on the metal being brazed. Silver brazing alloys, particularly of the self-fluxing variety, are convenient for use with copper. In the brazing operation, the brazing material may be first provided on the surface of the metalized ceramic disk or on the surface of the metallic member or may be in the form of a layer or preform therebetween. Or the brazing alloy may be flowed in molten form between the surfaces to be joined and then cooled to form a bond joining the two surfaces. Typically, when a nickel-plated copper member is brazed to a metalized ceramic member using a self-fluxing silver solder, a brazing temperature of about 1300 to 1350° F. is used.

By brazing, we refer to so-called hard soldering, which differs from conventional soldering only in using bonding alloys melting at a temperature above 800° F. and in which metallic surfaces are joined by flowing therebetween by capillary attraction alloys of lower melting point than the metals to be joined. The metal surfaces remain unmelted but are solidly united when the molten solder or brazing alloy solidifies. Representative brazing alloys are shown in the article entitled "Solders and Brazing Alloys" in Encyclopedia of Chemical Technology (Kirk-Othmer), vol. 12, pp. 634 et seq., Interscience, New York, 1954, and reference may be made thereto for other illustrative brazing methods and for other alloys suitable for the brazing of different metals.

It will, of course, be apparent that while an important application of this invention is in the miniaturization art, it may also be utilized where somewhat larger assembles are to be joned. Thus, this invention is not to be limited to the specific illustration thereof shown. Similarly, while a waffle-like pattern is preferred and convenient, it will be realized that other shapes and forms of raised portions of the surface of the metallic member may be availed of, depending on the particular application involved, and these various forms, whether shaped as knurls, knobs, studs, serrations, ridges, corrugations, or other surface projections are conceived as falling within the scope of this invention. Accordingly, the scope of this invention should be determined in accordance with the objects and claims thereof.

We claim:

1. The method of bonding a metallic member to a nonmetallic member having a metalized surface, the two members having different coefficients of expansion, comprising forming a plurality of integral raised metal portions of said metallic member on a first surface of the metallic member without thereby altering an opposing surface, juxtapositioning said metallic member first surface and the metalized surface of the nonmetallic member, and conductively joining the raised portions of the metallic member first surface to the metalized surface of the nonmetallic member to form a thermally stable bonded assembly.

2. The method of bonding a metallic member to a ceramic member having a metalized surface comprising forming a plurality of integral raised metal portions of said metallic member on a first surface of the metallic member without thereby altering an opposing surface, juxtapositioning said metallic member first surface and the metalized surface of the ceramic member, and conductively joining the raised portions of the metallic member first surface to the metalized surface of the ceramic member to form a thermally stable bonded assembly.

3. The method of bonding a metallic member to a ceramic member having a metalized surface comprising grooving a first surface of the metallic member to form a plurality of raised portions thereon without thereby altering an opposing surface, juxtapositioning the grooved surface of the metallic member and the metalized surface of the ceramic member, and brazing the raised portions of the metallic member grooved surface to the metalized surface of the ceramic member to form a thermally stable bonded assembly.

4. The method of bonding a metallic member to a ceramic member having a metalized surface which comprises grooving a first surface of the metallic member to provide a regular cross-hatched pattern of depressed and raised portions thereon without thereby altering an opposing surface, juxtapositioning the grooved surface of the metallic member and the metallized surface of the ceramic member, and brazing the raised portions of the metallic member grooved surface to the metallized surface of the ceramic member to form a thermally stable bonded assembly.

5. A thermally stable bonded assembly of a metallic member and a ceramic member which comprises, in combination, a metallic member having a first surface containing a regular integral cross-hatched pattern of depressed and stud-like raised portions of said metallic member, a ceramic member having a metalized surface disposed adjacent said metallic member first surface, and a brazing alloy contacting said raised portions and said metalized surface joining said metallic and ceramic members.

6. A thermally stable bonded assembly of a metallic member and a ceramic member which comprises, in combination, a metallic member selected from the class consisting of copper, aluminum, and alloys thereof, said metallic member having a surface containing a regular cross-pattern of stud-like raised metal portions of said metallic member of substantially similar thickness and height projecting at least 5 mils above the surface of the metallic member and varying in cross section between 1 mil in diameter and ⅛-inch square, a ceramic member having a metalized surface disposed adjacent said metallic member surface, and a brazing alloy contacting said raised portions and said metalized surface joining said metallic and ceramic member.

7. A method of providing heat transfer between two metallic members while maintaining electrical insulation therebetween which comprises providing an electrically insulating ceramic member having at least two metalized surfaces, grooving a first surface of each of said metallic members to form a plurality of stud-like raised portions thereon without thereby altering an opposing surface, juxtapositioning the grooved surface of each metallic member adjacent to a facing metalized surface of the ceramic member in a stacked arrangement, and brazing the raised portions of the metallic member first surface to the facing metalized surface of the ceramic member to form thereby a thermally conductive, thermally stable bonded assembly wherein the metallic members are electrically insulated from one another.

8. A thermally conductive, thermally stable bonded assembly of two metallic members electrically insulated from one another which comprises a pair of metallic members, a first surface of each of said members containing a regular integral cross-hatched pattern of depressed and stud-like raised portions of said metallic members, an electrically insulating ceramic member having at least two metalized surfaces, said ceramic member being interposed between said metallic members so arranged that a first surface of each said member is adjacent to a facing metalized surface of the ceramic member, and a brazing alloy contacting said raised portions of each said first surfaces of said metallic members and said metalized surfaces serving to joint said metallic and ceramic members to form a thermally conductive, thermally stable bonded assembly.

References Cited by the Examiner

UNITED STATES PATENTS

| | | | |
|---|---|---|---|
| 2,279,831 | 4/1942 | Lempert | 29—472.5 X |
| 2,857,663 | 10/1958 | Beggs | 29—473.1 |
| 2,920,385 | 1/1960 | Fike | 29—473.1 X |
| 3,103,741 | 9/1963 | Stoeckert | 29—472.5 |
| 3,114,612 | 12/1963 | Friedrich | 29—195 |
| 3,171,519 | 3/1965 | Nolte | 29—473.1 |

HYLAND BIZOT, *Primary Examiner.*